United States Patent [19]

Horecky et al.

[11] 3,867,760

[45] Feb. 25, 1975

[54] PRINTED CIRCUIT BOARD LEAD WIRE RECEPTACLE

[75] Inventors: Stanley V. Horecky, Oak Park; Cletus McDonough, Elmurst, both of Ill.

[73] Assignee: Molex Products Company, Downers Grove, Ill.

[22] Filed: June 29, 1973

[21] Appl. No.: 375,237

Related U.S. Application Data

[60] Continuation of Ser. No. 141,523, May 10, 1971, abandoned, Division of Ser. No. 798,936, Feb. 13, 1969, Pat. No. 3,621,445.

[52] U.S. Cl. .............. 29/628, 29/203 B, 29/203 DT, 29/203 DTS, 29/626, 339/17 R

[51] Int. Cl. .......................... H01r 9/00, H05k 3/32

[58] Field of Search ............. 29/625, 626, 629, 628, 29/630 A, 630 D, 203 R, 203 B, 203 D, 203 S; 339/276 SF, 17 R, 17 C

[56] References Cited

UNITED STATES PATENTS

| | | | |
|---|---|---|---|
| 2,871,551 | 2/1959 | Harris | 339/17 C X |
| 2,877,441 | 3/1959 | Narozny | 339/17 R X |
| 2,950,458 | 8/1960 | Artz | 339/17 R X |
| 3,072,880 | 1/1963 | Olsson | 339/217 S |
| 3,166,372 | 1/1965 | Just | 29/203 B |
| 3,457,640 | 7/1969 | Rayburn | 29/629 |
| 3,545,606 | 12/1970 | Bennett et al. | 29/626 X |
| 3,550,250 | 12/1970 | Ceruenka et al. | 29/630 D UX |
| 3,562,903 | 2/1971 | Busler et al. | 29/629 X |
| 3,601,750 | 8/1971 | Mancini | 29/626 UX |
| 3,676,926 | 7/1972 | Kendall | 29/62 S |

*Primary Examiner*—C. W. Lanham
*Assistant Examiner*—Joseph A. Walkowski
*Attorney, Agent, or Firm*—Olson, Trexler, Wolters, Bushnell & Fosse, Ltd.

[57] ABSTRACT

A connector terminal including a cylindrically shaped, rolled, hollow body having an opening or separation extending the length thereof. A first, narrowed end of the body is received in an aperture in a printed circuit board and is soldered to a corresponding conductor printed on the latter. The second end of the terminal extends outwardly from the opposite surface of the printed circuit board and includes resilient means therein. A lead wire of an electrical component inserted into the second end of the body of the connector terminal is engaged by said resilient means electrically to interconnect the printed conductor and electrical component.

3 Claims, 17 Drawing Figures

Inventors
Stanley V. Horecky
Cletus McDonough
By: Olson Trexler, Wolters & Bushnell Attys.

PATENTED FEB 25 1975

3,867,760

SHEET 2 OF 3

Inventor
Stanley V. Horecky
Cletus McDonough
By Olson, Trexler, Wolters & Bushnell Attys Inventors
Stanley V. Horecky
Cletus McDonough
By: Olson, Trexler, Wolters & Bushnell attys.

PRINTED CIRCUIT BOARD LEAD WIRE RECEPTACLE

REFERENCE TO RELATED APPLICATION

This application is a continuation of U.S. application Ser. No. 141,523; filed May 10, 1971, now abandoned; which application was in turn a division of application Ser. No. 798,936; filed Feb. 13, 1969, now U.S. Pat. No. 3,621,445.

BACKGROUND OF INVENTION

This invention relates generally to printed circuit board connectors and more particularly to connector devices for mounting electrical components on a printed circuit board.

Conventionally, electrically to connect a multi-lead electrical component, such as a solid state device such as a transistor, diode, or integrated circuit chip, to the copper conductors of a printed circuit board, holes are provided through the conductors and board for receipt therein of the leads of the component. After the leads have been inserted into the holes they are, usually by means of a wave soldering technique, connected to respective copper conductors on the board.

If it becomes necessary to replace the component, the leads thereof must be severed or they must be simultaneously heated and unsoldered, and the component must be removed from the board. This is not possible in some cases, in that often printed circuit boards are used in places where access thereto with a soldering iron, etc., is prevented. Furthermore, excessive heating of the component in an attempt to remove it from the board could cause damage thereto.

In some cases mounting devices are used to secure the leads to the conductors of the printed circuit board; however, these devices are expensive and still do not provide a satisfactory way of removing the component from the printed circuit board when such removal becomes necessary.

SUMMARY OF THE INVENTION:

Accordingly, it is a primary object of this invention to provide a connector device for removably mounting an electrical component to a printed circuit board in an efficient, reliable manner.

It is another object of this invention to provide a printed circuit board connector device of the above-mentioned type which is inexpensive to produce and simple to use.

It is a more specific object of this invention to provide a terminal connector device for connecting an individual lead wire of an electrical component to a conductor of a printed circuit board from which the lead may be removed easily.

It is another object of this invention to provide an assembly of joined connector devices of the above described type which can be mounted simultaneously to a printed circuit for accommodating a plurality of easy to remove lead wires of an electrical component.

It is yet another object of this invention to provide a method for easily and quickly mounting a plurality of terminal connector devices on a printed circuit board.

Briefly, a preferred embodiment of a connector terminal mounting device according to the invention includes a cylindrically shaped hollow body, a first end of which is narrowed and which is received in an aperture in a printed circuit board. The first end of the terminal is soldered to a corresponding printed conductor of the printed circuit board, preferably by a wave soldering technique. The second end of the body extends outwardly from the opposite surface of the printed circuit board and includes therein a resilient contact portion. A single lead of an electrical component is received in the last-mentioned end and is engaged by the contact portion to make both a mechanical and electrical connection therewith. The connector terminal is constructed of a single piece of stamped metal which is rolled into a hollow, cylindrical shape.

A plurality of the connector terminal devices may be produced in chain form whereby a chain of terminals may be mounted simultaneously on the printed circuit board, or individual terminal devices may be severed from the chain and mounted on the board quickly and easily according to the invention.

DESCRIPTION OF THE DRAWINGS

A better understanding of the present invention and its organization and construction may be had by referring to the description below taken in conjunction with the accompanying drawings, wherein.

DETAILED DESCRIPTION

Figures 1, 2, 3, 4, 5:
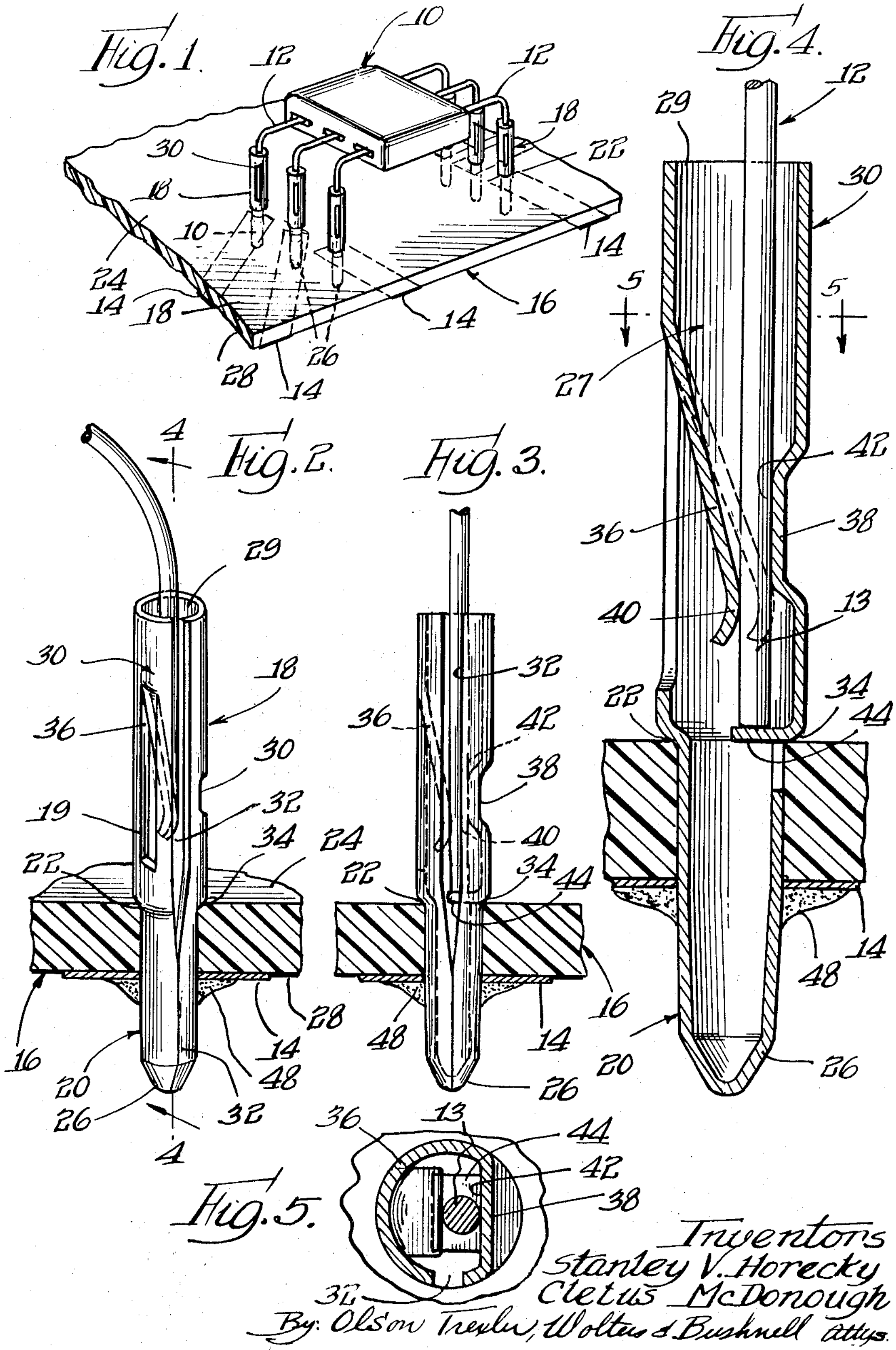
FIG. 1 is a perspective view of a multi-lead electrical component connected to the conductors of a printed circuit board by means of a plurality of connector terminals according to the invention.
FIG. 2 is an enlarged, partially sectioned isometric view of a single connector terminal according to the invention receiving a lead therein and being connected to a conductor of a printed circuit board.
FIG. 3 is an elevational view of the connector terminal of FIG. 2 with the printed circuit board in section.
FIG. 4 is an enlarged axial sectional view of a connector terminal according to the invention taken along the line 4—4 of FIG. 2, in the direction indicated.
FIG. 5 is a cross-sectional view of the connector terminal of FIG. 4 taken along the line 5—5 thereof running transversely to the axis of the connector terminal.

Referring now to the drawings in more detail, there is shown an electrical component 10 in FIG. 1 thereof, having a plurality of lead wires 12 extending therefrom. The lead wires 12 of the component 10 are connected, by means of a corresponding number of terminal connectors 18 according to the invention, to respective conductors 14 printed on the lower surface 28 of a printed circuit board 16. As can be seen in the figure, first ends 20 of the terminal connectors are received in apertures 22 in the board from the upper surface 24 thereof. The ends 20 extend through the board so that the extreme leading tips 26 thereof protrude beyond the opposite surface 28 and the printed conductors 14 to allow the terminal connectors to be soldered to the conductors 14. The lead wires 12 of the electrical component 10 are removably inserted into respective upper ends 30 of the terminal connectors wherein both a mechanical and electrical connection are made therebetween.

A single terminal connector 18 is shown in FIGS. 2–5 of the drawings. The terminal connector 18 is shown received in an aperture 22 in the printed circuit board 16 and includes a body 19 constructed of a single piece of resilient metal which is formed into a cylindrical or tubular shape by means of a rolling process of a known type to provide an internal bore or passageway 27. The extreme end or tip 26 of the body 19 is rounded or tapered to close off one end of said passageway 27, and to facilitate insertion of end 26 into aperture 22. The opposite end of the tubular connection 18 is open, as indicated at 29. The body 19, it will be noted, includes a seam opening or separation 32 running the length thereof. The separation 32, as it appears in aperture 22 in FIG. 2, is narrow at a first or leading end of the terminal 20 and widens as it extends toward a second or trailing end 30 of the terminal. Due to the resiliency of the metal from which the tubular terminal connector is constructed, the rolled connector terminal tends normally to open along the separation 32. Thus, after terminal end 20 is inserted in an aperture 22 in a printed circuit board, which is of a smaller diameter than the diameter of the end 20 in the normal state, the end 20 tending to open at the separation 32, provides a friction fit in the aperture 22. This assures good positioning of the terminal therein and prevents the terminal connector from being removed from the printed circuit board both prior and subsequent to soldering.

The end 20 of the terminal connector which extends less than half the length thereof has a diameter less than that of the trailing end 30. A shoulder 34 is provided at the juncture of the two ends 20 and 30, and serves to limit the insertion of the smaller leading end 20 into aperture 22 in the printed circuit board.

Trailing end 30 of the connector terminal 18 includes a resilient, tonguelike contact 36 which is stamped or cut from the body 19 of the terminal connector. The contact 36 is bent so that the free end 40 thereof, as can be seen in FIGS. 3 and 4 of the drawings, extends inwardly into bore 27 of the tubular body 19 and resets against the inner wall 42 of an indentation 38 formed opposite the contact 36 in the body of the connector terminal.

As can be seen in FIG. 3, the free end 40 of the contact 36 is curved and, as mentioned above, normally rests against the inner wall 42 of indented portion 38 to provide a restriction in bore 27. However, as shown in FIGS. 4 and 5, when an end 13 of a lead wire 12 of an electrical component is received in bore 27 through the open end 29 of trailing end 30, the resilient contact 36 is displaced and the wire 12 is gripped between said contact 36 and indentation 38; the curved end 40 of contact 36 acting as a cam surface to allow the lead wire to be inserted easily thereinto.

Directly beneath contact 36 and wall 42 of indented portion 38, and extending inwardly into body 19 at shoulder 34 thereof, is a stop 44. The stop, as shown in FIGS. 4 and 5 of the drawings, limits the insertion of the end 13 of the lead wire 12 into trailing end 30 of the terminal connector. In addition, the stop prevents solder from entering end 30 of body 19 of the terminal connector 18 as the printed circuit board is run through a solder bath, or is manually soldered.

It will be noted, in FIGS. 2 through 4, that solder 48 has been applied about the end 20 of the terminal connector 18, causing printed circuit board conductor 14 and terminal end 20 to be joined, thereby to form a mechanical and electrical connection therebetween. The friction fit of ends 20 in apertures 22 in combination with the solder 48 applied to the terminal connectors 18 and to the printed circuit conductor 14, provide adequate mechanical holding force to prevent the terminal connectors 18 from being pulled from the apertures 22 of the printed circuit board when it becomes necessary to withdraw the lead wires 12 from end 30 of the connectors.

For purposes of affording a more complete understanding of the invention, it is advantageous now to provide a functional description of the mode in which the component parts thus far described cooperate.

Initially a printed circuit board 16 is provided; the printed circuit board being of the usual type including a plurality of conductors 14 printed on one surface 28 thereof. A plurality of apertures or holes 22 having a predetermined diameter, extends through the board and conductors for accommodating a corresponding number of lead wires of an electrical component electrically and mechanically to connect the component to the conductors. Into each one of the above-mentioned holes, from the surface 24 of the printed circuit board opposite surface 28 thereof, there is inserted a terminal connector 18. Tip 26 of the terminal connector, which is tapered as shown in FIGS. 2–4 to provide easy insertion thereof, is first received in one of the holes 22. The tapered tip, upon entering the hole, causes the rolled, tubular shaped terminal connector to be closed at separation 32 thereof, so that end 20 may be pushed easily into the hole. Once within the hole in the printed circuit board, the effect of end 20 tending to unroll and assume its normal shape causes it to be forced against the printed circuit board surrounding the hole 22, thereby to securely hold the terminal connector in place in the latter. The end 20 of the terminal connector is able to be inserted in hole 22 only up to the shoulder portion 34 which separates ends 20 and 30 of the connector. End 20, however, passes through the board with tip 26 thereof extending outwardly from surface 28 and conductor 14. This procedure is repeated for each terminal connector to be used on the board.

When all of the terminal connectors are in place, the ends 20 are soldered to respective conductors 14 of the board 16 either manually or by a wave soldering technique which provides for quickly soldering the many connections. Being able to complete all the required soldering prior to the introduction of the electrical component avoids heating of the lead wires of the component which may be harmful to the latter.

After the above is completed, individual lead wires 12 of an electrical component 10 may be inserted into corresponding ones of the terminal connectors. The rounded or curved end 40 of the contact 36 provides for easy entry and withdrawal of the end 13 of lead wire 12 into and out of engagement with the terminal connector.

As explained heretofore, the insertion of a lead wire into end 30 of the terminal connector forces the tongue-like, resilient contact 36 away from the wall 42 of indentation 38 (FIGS. 3 and 4). The force of the contact 36 seeking to return to its normal position against wall 42 serves to provide a satisfactory electrical and mechanical connection between the terminal connector and lead wire.

In FIGS. 11–17 there is illustrated an alternate embodiment of the present invention. The terminal connector of said figures is similar to that as previously discussed, except for the particular means employed to maintain the lead wire in conductive engagement therewith. Accordingly, said alternate embodiment will be designated 18', and those structural features and elements similar to those previously identified with regard to the embodiment of FIGS. 1–5, will be given like reference characters, primed.

It should be noted that the terminal connector 18' is employed, with respect to the printed circuit board 16' and connector 14', in the same manner as discussed with respect to connector 18. Accordingly, a detailed discussion of the manner of using said connector 18' is deemed unnecessary, the prior discussion being incorporated herein by reference.

Figures 11, 12, 13, 14, 15, 16, 17:
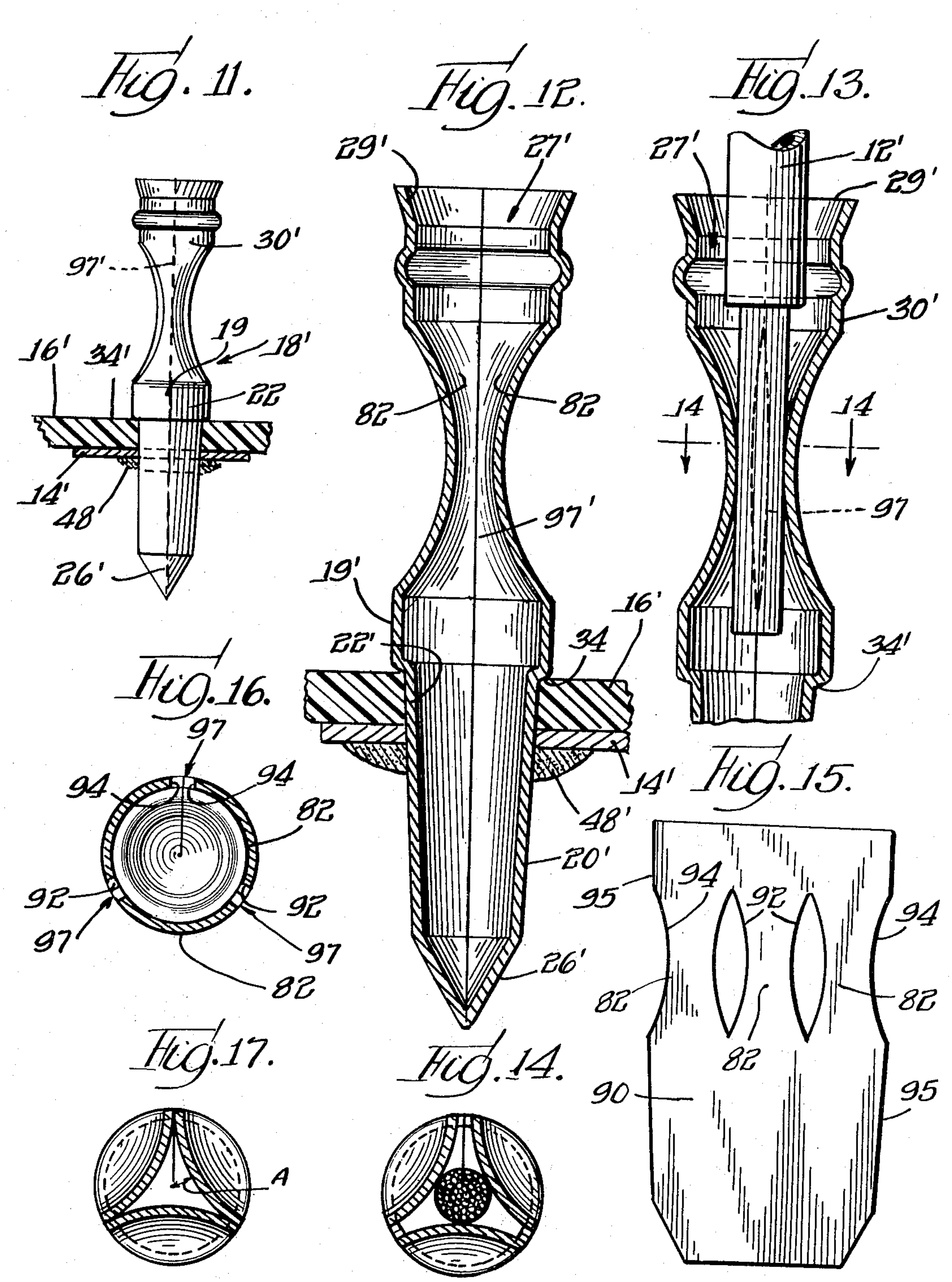
FIG. 11 is an elevational view of an alternate connector terminal constructed in accordance with the present invention and engaged in a printed circuit board, which is illustrated in section.
FIG. 12 is an enlarged sectional view of the terminal connector illustrated in FIG. 11.
FIG. 13 is a partial sectional view of a terminal connector of FIGS. 11 and 12 with a wire lead engaged therein.
FIG. 14 is a sectional view taken along the line 14—14 of FIG. 13 in the direction indicated.
FIG. 15 is an elevational view of a sheet-like blank that may be formed to provide the terminal connector of FIGS. 11–13.
FIG. 16 is a sectional view of the sheet-like blank of FIG. 15 after same has been rolled to provide a hollow cylindrical member, but before the bowed wall portions have been formed.
FIG. 17 is a sectional view similar to FIG. 16 and illustrating how dies may be employed to provide the terminal connector with arcuate inwardly bowed wall portions.

Turning now to FIGS. 11–13, terminal connector 18' differs from connector 18 in a number of respects, however, the only primary difference between these two terminal connectors being in the resilient means employed to affix the wire lead 12' thereto. As can be seen with reference to FIG. 12, the trailing portion 30' of said connector 18' is provided with a plurality of inwardly bowed wall sections 82. Each said section 82 is of an arcuate configuration both in the horizontal and vertical sectional planes. Thus, these bowed wall sections 82 cooperate to define an hourglass-like passageway 27' in the trailing portion 30' of said body 19'.

The hourglass-like passageway 27' is of maximum radial dimension at the open end 29' of said terminal, and due to the arcuate configuration of said wall sections 82, as said passageway 27' extends inwardly it narrows to a minimum radial dimension midway of the trailing end portion 30' and then widens again approximate entry into the first or leading end portion 20'. In this regard, it should be noted that the term "radial dimension" as used above and hereinafter refers to a dimension taken from the center line of terminal connector 18' to the closest point on the surface of one of said arcuate wall portions 82. By way of example, the radial dimension referred to is represented by dimension A of FIG. 17. Accordingly, to insure firm gripping of the wire lead 12' the minimum radial dimension A of passageway 27' is selected to be less than the radius of the lead wire 12' to be engaged therein.

Directing attention to FIGS. 15–17, there is illustrated the manner in which said terminal connector 18' is constructed. Initially, a sheet metal blank 90 is formed with elliptical cut-out portions 92 and correspondingly shaped arcuate notches 94 on the parallel edges 95. Next, the blank 90 is rolled into a cylindrical configuration with the edges 95 in engagement to provide a seam and the lower portion thereof crimped to provide the rounded or tapered tip 26'. After having been rolled, the blank 90 as shown in FIG. 16 now has three elliptical openings 97 therein, two provided by cut-outs 92 and the third by the juxtaposed notches 94.

Accordingly, after the blank 90 has been rolled, FIG. 16, the wall portions 82 as viewed in section are arched radially outward, and do not bow inwardly, as is illustrated with regard to the finished product of FIG. 12. In addition, each of the respective wall portions is spaced from the adjacent portion by the elliptical openings 97. To provide the finished product, the rolled blank 90 of FIG. 16 is subjected to a forming operation, as illustrated in FIG. 17, which bows the wall portions 82 inwardly to bring the edges thereof into engagement, thereby eliminating the openings 97 as seen in FIG. 16. The result of this operation is to provide seams between the said wall portions 82 which are designated 97' in FIG. 17. These seams 97' provide a certain amount of resiliency for the now bowed wall portions 82, so that they may be distended upon introduction of a wire lead therebetween.

Briefly, regarding assembly, after the terminal connector 18' has been soldered to the terminal board 16' the wire lead 12' may be introduced therein through the opened end 29' of the leading end portion 30'. As the wire lead 12' passes inwardly into the hourglass-like passageway 27' it will engage the arcuate inwardly bowed surfaces of the wall portions 82, such that continued insertion of said wire lead 12' will expand or distend said wall portions 82 outwardly, as seen in FIGS. 13 and 14. The aforementioned radial expansion of said bowed wall portions 82 is accommodated by the seams 97' which expand as shown in said FIGS. 13 and 14.

Thus, the terminal connectors according to the invention provide means whereby reliable connection of an electrical component to printed circuit conductors may be made, while still being able to remove the electrical component therefrom without difficulty and without damage to the component or the printed circuit board. Electrical components may be changed easily and quickly through the use of the terminal connector. Furthermore, because of the one-piece construction of said terminal connectors, they are relatively inexpensive to produce and use.

Figures 6, 7, 8, 9, 10:
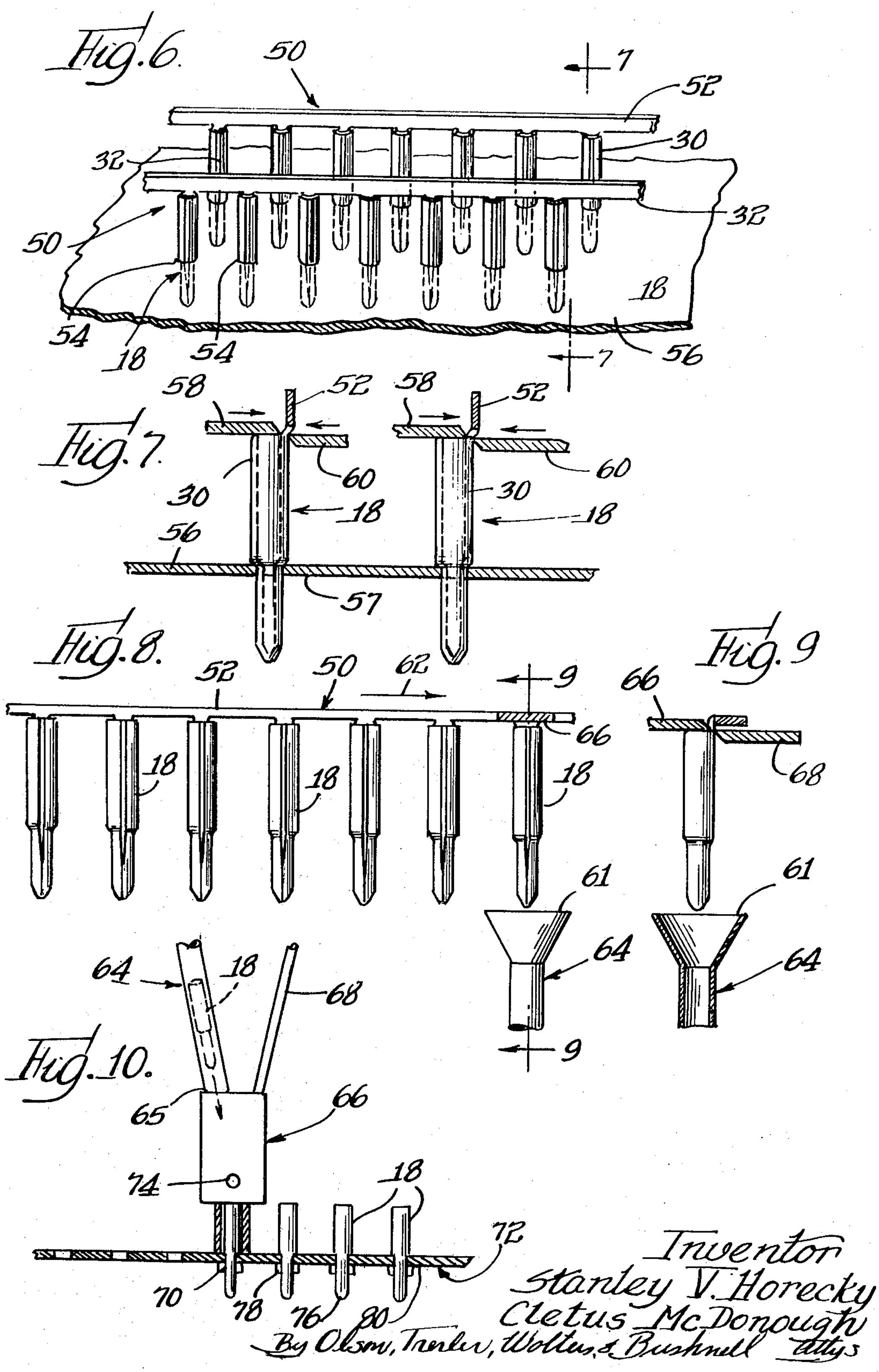
FIG. 6 is a perspective view of a plurality of connector terminals formed in a chain or strip being mounted on a printed circuit board in spaced-apart apertures therein according to the invention.
FIG. 7 is an end sectional view of the chains of terminal connectors of FIG. 6 taken along the line 7—7 thereof, illustrating the manner in which individual terminals are severed from the chains after they have been mounted in a printed circuit board.
FIGS. 8–10 illustrate the steps of a method for easily and quickly mounting a number of individual terminal connectors in apertures in a printed circuit board, according to the invention.

The terminal connectors 18, 18' shown in the drawing preferably are produced in an interconnected chain form, thus facilitating the production and handling of a greater quantity of terminal connectors in less time. The interconnected connector terminals may take the form of chains 50 as illustrated in FIG. 6, which chain is comprised of connector 18. When produced in chain form, a linking strip 52 is retained, attached to the trailing end 30 of each of the terminal connectors 18 to secure the connectors as a unit.

The strip 52, as will be noted, is attached to each terminal connector on the side of the trailing end thereof opposite the seam 32 extending the length of the terminal, since the terminals and connecting strips are stamped from a single sheet of flat metal. The terminals are then rolled into the form shown in the figure, remaining attached to the strip 52.

As well as having the advantage of being produced quickly, the plurality of terminal connectors of the chain thereof may be inserted simultaneously into complementarily spaced-apart apertures, such as 54, in a printed circuit board 56, after which the plurality of terminals may be wave soldered to conductors printed on the lower surface 57 (FIG. 7) of the board, as explained heretofore.

Once the terminal connectors are in place, the strip 52 may be removed from each of the terminals, as shown in FIG. 7, wherein a pair of movable blades 58, 60, is used to snip or sever strip 52 from the extreme trailing ends 30 of the terminal connectors 18. The blades 58 and 60 are in opposing relation and in shearing engagement with each other, and are arranged for movement toward each other in the direction of the arrows to slice through the metal strip as shown.

FIGS. 8–10 illustrate the steps of a fast, easy method for mounting separately the terminal connectors of a chain 50 thereof in case the mounting of the terminal connectors should not be or are preferred not to be mounted simultaneously.

As shown in FIG. 8, a chain 50 of connector terminals has been formed as described above. The chain 50 passes along in the direction of arrow 62. The connector terminals 18 are successively positioned directly above a first end 61 of a funnel-shaped guide tube 64, and are successively severed from the common linking strip 52 by means of a pair of shearing blades 66, 68 (FIG. 9) similar to blades 58, 60. After a connector terminal is severed as described it falls, due to gravity, into end 61 of tube 64.

Tube 64 is elongated as shown in FIG. 10, and the opposite end 65 thereof is connected to a pneumatic terminal mounting device 66, of a well known type. The terminal mounting device 66 which is operated by means of air pressure, supplied through a tube 68 from a pressurized air supply (not shown), is placed over an aperture such as 70, in a printed circuit board 72. The operating switch 74 of the mounting device is moved to the "on" position and a surge of air is released automatically thereinto, to in turn propel a terminal 18 according to the invention into aperture 70. This process is continued, relatively moving device 66 and board 72 along from aperture to aperture on board 72. After all of the terminal connectors 18 required for a particular circuit configuration are mounted on board 72, the ends 76 thereof may be wave soldered to printed conductors 78 located on the lower surface 80 of the board.

Through this mounting technique, terminal connectors 18 can be mounted rapidly on printed circuit boards. This process which may be fully automated can speed the production of printed circuit boards, etc. which use terminal connectors of a type according to the invention.

While particular embodiments of the invention have been shown and described, it should be understood that the invention is not limited thereto, since many modifications may be made. It is therefore contemplated to cover by the present invention any and all such modifications as fall within the true spirit and scope of the appended claims.

The invention is claimed as follows:

1. A process for making electrical connections between a plurality of lead wires and a printed circuit board support surface having aligned apertures of predetermined diameter, said method comprising the steps of: forming a series of spaced apart tubular terminal connector members from flat strip material each said terminal being attached at spaced intervals to a linking strip; providing each tubular terminal connector with a longitudinal seam the edges of which are spaced apart along at least a portion of said connector; and further providing said connector with a tubular leading end portion and a tubular trailing end portion and with there being an axially presented positive stop shoulder at the junction of said end portions of minimum diameter greater than the predetermined diameter of the support surface apertures and with the trailing end portion having a resilient restriction in the bore thereof; and providing that the linking strip is attached to the trailing end portion only of each member, opposite to the longitudinal seam thereof, such that each leading end portion is free for insertion into a supporting surface whereby the respective connector members are joined entirely through said linking strip; simultaneously inserting the leading end portions of said terminal connector members into corresponding apertures in said support surface, while resilient compressing said connector member thereof to a degree permitting insertion thereof in said aperture to obtain a friction fit, while maintaining the diameter of said shoulders greater than the predetermined diameter of the support surface apertures and engaging said shoulder with said support surface to locate accurately the leading and trailing end portions of the tubular body from opposite sides of the support surface; connecting said terminal connector members to said support surface; severing said terminal connector members from said linking strip; and inserting a plurality of said lead wires respectively into said terminal connector members through the trailing end portions thereof an amount sufficient such that electrical connections are made between said terminal connector members and said lead wires at said resilient restrictions.

2. A process according to claim 1 wherein the step of connecting the terminal members to the support surface includes the step of soldering said members to said support surface.

3. A process according to claim 1 wherein the step of severing said terminal connector members from the linking strip, includes the step of affecting said severing by relatively movable shear blade members.

* * * * *